United States Patent [19]
Thiruvengadam

[11] Patent Number: 5,710,780
[45] Date of Patent: Jan. 20, 1998

[54] DIGITAL CIRCUITRY WITH IMPROVED PARALLEL SIGNATURE ANALYSIS CAPABILITY

[75] Inventor: Sudha Thiruvengadam, Sugarland, Tex.

[73] Assignee: Texas Instruments Incorporated, Dallas, Tex.

[21] Appl. No.: 695,139

[22] Filed: Aug. 8, 1996

Related U.S. Application Data

[63] Continuation of Ser. No. 249,482, May 26, 1994, Pat. No. 5,572,536.

[51] Int. Cl.$^6$ ................................................ G01R 31/317
[52] U.S. Cl. .................... 371/22.4; 371/22.3; 364/579
[58] Field of Search .................. 371/22.4, 22.3, 371/25.1, 27, 22.1, 24; 364/579; 324/73.1, 158.1; 327/298, 296, 284, 241, 57, 176, 202, 211–213, 395, 400, 403, 94; 326/93, 38, 40, 46, 16; 377/77, 80, 81; 365/78, 189.05

[56] References Cited

U.S. PATENT DOCUMENTS

| | | | |
|---|---|---|---|
| 4,594,711 | 6/1986 | Thatte | 371/22.3 |
| 4,597,080 | 6/1986 | Thatte et al. | 371/22.3 |
| 4,601,034 | 7/1986 | Sridhar | 371/22.4 |
| 4,667,339 | 5/1987 | Tubbs et al. | 327/213 |
| 4,752,729 | 6/1988 | Jackson et al. | 324/73.1 |
| 4,913,557 | 4/1990 | Segawa et al. | 371/22.3 |
| 5,003,204 | 3/1991 | Cushing et al. | 326/40 |
| 5,032,783 | 7/1991 | Hwang et al. | 371/22.3 |
| 5,051,996 | 9/1991 | Bergeson et al. | 371/22.4 |
| 5,241,265 | 8/1993 | McDonnell et al. | 371/22.3 |
| 5,258,985 | 11/1993 | Spence et al. | 371/22.4 |
| 5,306,959 | 4/1994 | Knauft et al. | 327/176 |
| 5,412,665 | 5/1995 | Gruodis et al. | 371/27 |
| 5,450,418 | 9/1995 | Ganapathy | 371/24 |
| 5,457,698 | 10/1995 | Segawa et al. | 371/22.3 |
| 5,459,736 | 5/1995 | Nakamura | 371/25.1 |
| 5,463,338 | 10/1995 | Yurash | 327/202 |
| 5,488,615 | 1/1996 | Kunoff et al. | 371/22.4 |

OTHER PUBLICATIONS

"CMOS Gate Array Design Manual", SCOPE Cell Design Guide, Sections D4.3, D4.3.1, D4.3.2, D4.3.3 and D4.3.4; Texas Instruments, Inc; August, 1990.

*Primary Examiner*—James P. Trammell
*Assistant Examiner*—Hal P. Wachsman
*Attorney, Agent, or Firm*—Scott B. Stahl; James C. Kesterson; Richard L. Donaldson

[57] ABSTRACT

Digital circuitry (11) in a data processing system (10) includes parallel signature analysis circuitry (49, 49A) having a sampling feature (51, 53, 89) which permits sampling any given signal on all clock phases of the digital circuitry.

19 Claims, 4 Drawing Sheets

DIGITAL CIRCUITRY WITH IMPROVED PARALLEL SIGNATURE ANALYSIS CAPABILITY

This is a continuation of application Ser. No. 08/249,482, filed May 26, 1994, now U.S. Pat. No. 5,572,536.

FIELD OF THE INVENTION

This invention relates gennerally to digital circuitry having functional and timing validation capabilities and, more particularly, to digital circuitry including a parallel signature analysis feature that permits sampling on multiple clock signals.

BACKGROUND OF THE INVENTION

Digital circuitry is used in myriad applications which touch virtually every aspect of life. Consider, for example, the extensive use of digital data processing circuitry in data processing systems. Conventional digital circuitry is sometimes designed to permit functional and timing validation thereof.

FIG. 1 illustrates a conventional parallel signature analysis (PSA) circuit having a plurality of data inputs respectively connected to a plurality of nodes A, B . . . C within an operational digital circuit. The PSA circuit of FIG. 1 includes a plurality of master/slave type shift register latches (SRLs), each having a master latch stage (MLAT) and a slave latch stage (SLAT). As seen from FIG. 1, nodes A, B and C are sampled on the master clock LMT. Assuming that node A behaves in the manner illustrated by FIG. 2, then the fall and rise of node A will be completely missed (assuming for this example falling edge clocking of the latch) as illustrated by the sample of A in FIG. 2, sample points being designated by Xs. The illustrated transition of node A could be the expected and proper transition, an incorrect and invalid transition, or a spurious transition. Regardless of the nature of the illustrated transition, however, it cannot be properly captured by the conventional parallel signature analysis circuitry of FIG. 1.

It is there desirable to provide digital circuitry having a parallel signature analyzer that improves upon the aforementioned disadvantageous result obtained with the parallel signature analyzer of prior art FIG. 1.

The present invention provides digital circuitry having a parallel signature analyzer with a sampling feature that improves upon the results obtained with prior art FIG. 1.

DETAILED DESCRIPTION

Figure 3:
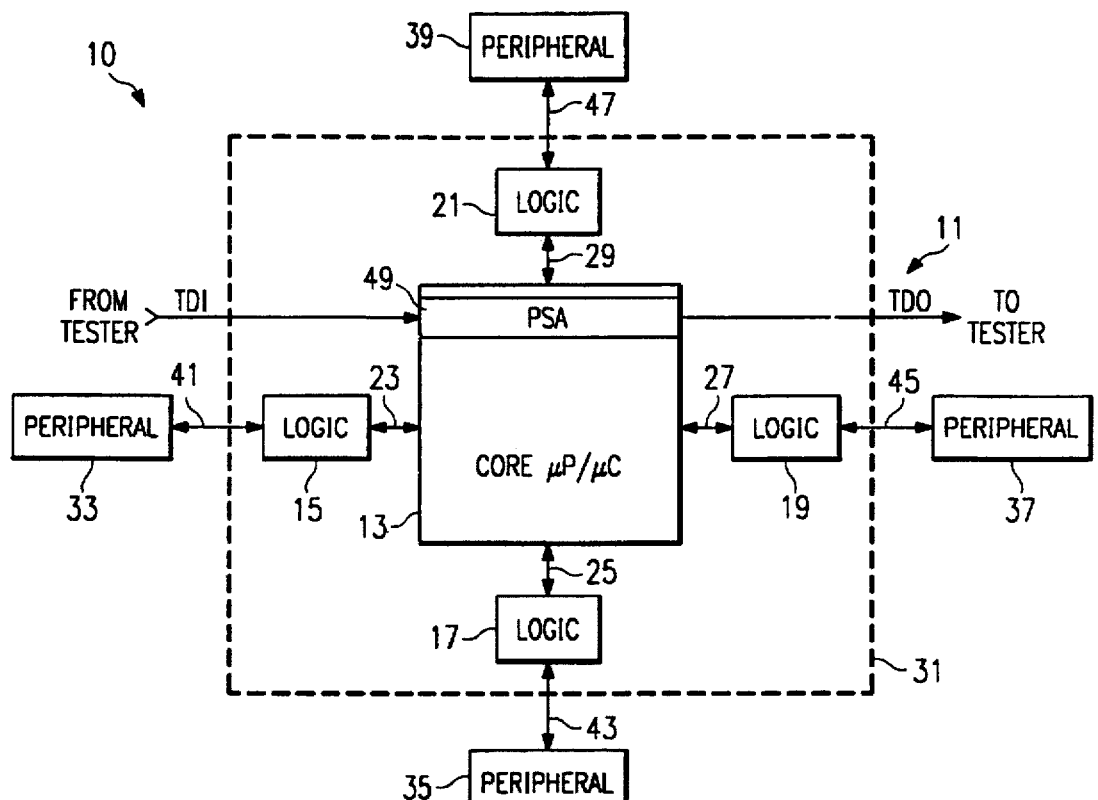
FIG. 3 is a block diagram of digital circuitry according to the present invention.

FIG. 3 illustrates an exemplary data processing system 10 according to the present invention. The data processing system 10 includes digital circuitry 11, in this example data processing circuitry in the form of an application specific integrated circuit (ASIC), which communicates with a plurality of peripheral circuitries 33, 35, 37 and 39 via respective busses 41, 43, 45 and 47, which busses cross the external pin boundary 31 of the ASIC 11. As the following description will demonstrate to workers in the art, the nature an quantity of peripheral circuitries 33, 35, 37 and 39, as well as their interconnection with digital circuitry 11 and with one another, do not represent critical elements of the present invention. The nature, quantity and connection of the peripheral circuitries in the system 10 of FIG. 3 can be as varied as necessary to realize any desired system application heretofore or hereafter conceivable, without departing from the scope of the present invention.

The ASIC 11 includes a core 13 which primarily includes data processing circuitry such as, for example, a microprocessor, a digital signal processor or a microcontroller. The core 13 is connected to support logic modules 15, 17, 19 and 21 via respective busses 23, 25, 27 and 29. The logic modules 15, 17, 19 and 21 can be suitably customized for interfacing with respective peripherals 33, 35, 37 and 39 via busses 41, 43, 45 and 47 at the pin boundary 31 of the ASIC device 11. The input/output signals from core 13, as carried on busses 23, 25, 27 and 29, may often be unavailable for external access at the busses 41, 43, 45 and 47 on the external pin boundary 31. In order to provide external access to the input/output signals carried on busses 23, 25, 27 and 29 for emulation and testing purposes, the core 13 is provided with parallel signature analysis circuitry 49. The parallel signature analysis circuitry 49 has a serial scan input and a serial scan output respectively connected to test data input (TDI) and test data output (TDO) pins at the pin boundary 31. The TDI and TDO pins are provided for connection to an external test controller from which serial test data inputs are received and to which serial test data outputs are provided.

Figure 4:
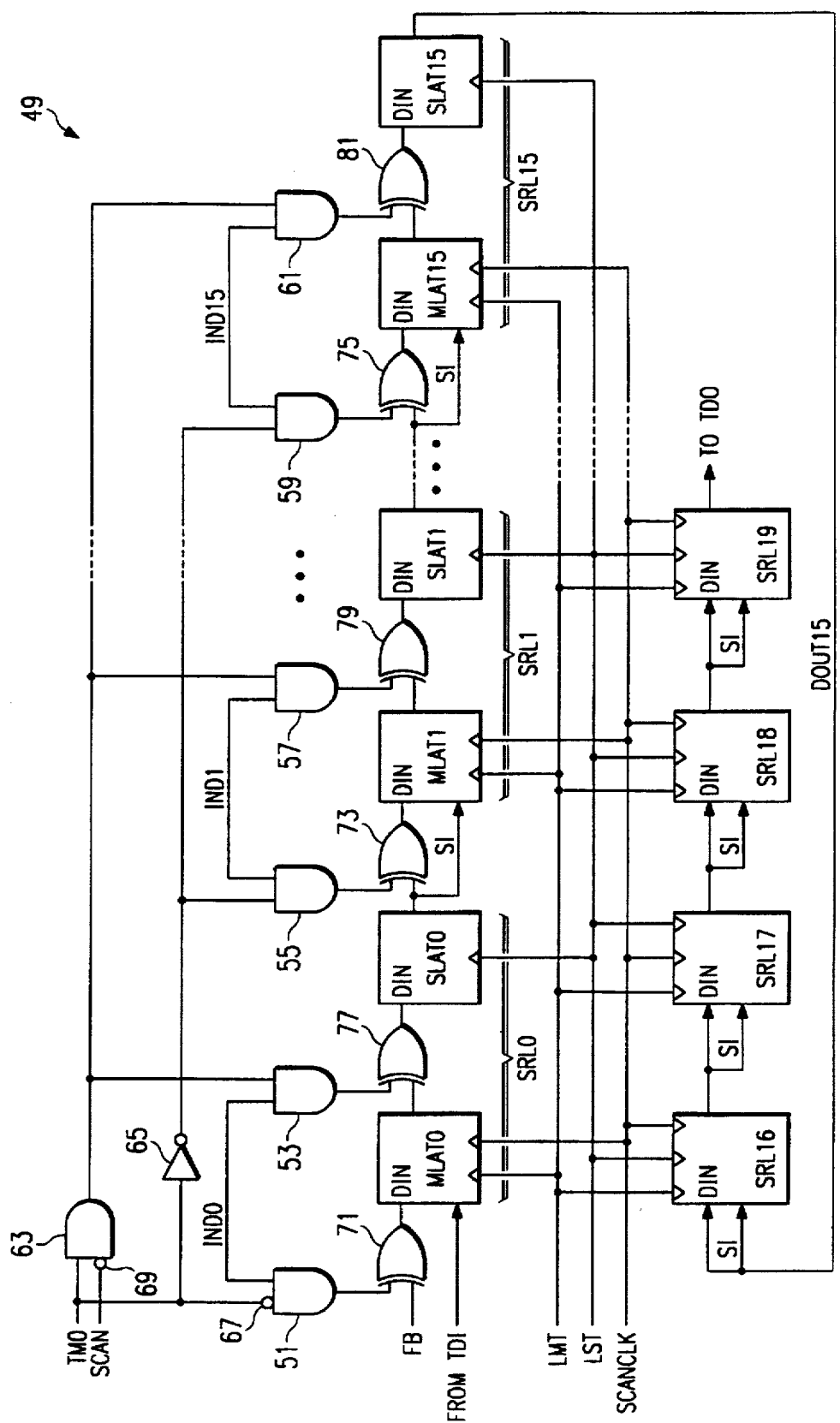
FIG. 4 illustrates one exemplary embodiment of the parallel signature analyzer of FIG. 3.

FIG. 4 illustrates the parallel signature analysis (or PSA) circuitry 49 in more detail. In FIG. 4, selected signals, for example from one or more of busses 23, 25, 27 and 29, are provided as inputs IND0, IND1 . . . IND15 of PSA circuitry 49. The signal at IND0 is qualified by AND gate 51 for input to the master stage MLAT0 of shift register latch SRL0, and is also qualified by AND gate 53 for input to the slave stage SLAT0 of SRL0. The signal at IND1 is qualified for input to the master and slave stages of SRL1 by respective AND gates 55 and 57, and the signal at IND15 is qualified for input to the master and slave phases of SRL15 by respective AND gates 59 and 61. The input structure for signals IND2–IND4 is omitted from FIG. 4 but is preferably identical to the input structure associated with signals IND0, IND1 and Signal TM0 is used to select whether the signals at IND0–IND15 are input to the master or slave stage of the associated SRL. By operation of invertor 65 and the inverting input 67 of AND gate 51, IND0–IND15 are input to the respective master stages when the signal TM0 is low. Thus, when signal TM0 is low, signals at IND0, IND1 . . . IND15 are passed through the respective AND gates 51, 55 . . . 59 for input to respective Exclusive-OR gates 71, 73 . . . 75.

The signals IND0, IND1 . . . IND15 are qualified at respective AND gates 53, 57 . . . 61 by the output of AND gate 63 whose inputs are TM0 and a scan signal inverted by inverting input 69 of AND gate 63. The scan signal of FIG. 4 is logic one when scanning data through SRL0–SRL19, and is otherwise logic zero. Thus, the signals at IND0–IND15 cannot be qualified for input to their respective slave latch stages when data is being scanned through SRL0–SRL19 (i.e., when the scan clock of FIG. 4 is active). This use of the scan signal to qualify inputs to the slave latch stages is important because the slave latch stages are clocked by the slave clock LST during scanning operations, and thus inputs from IND0, IND1 . . . INDL15 must not be applied to Exclusive-OR gates 77, 79 . . . 81 during scanning operations. Because the scan signal is a logic 1 when Scanning, AND gates 53, 57 . . . 61 apply logic 0 to the inputs of Exclusive-OR gates 77, 79 . . . 81 by virtue of the low output issued from AND gate 63 in response to the inversion of the scan signal at inverting input 69. Exclusive-OR gates 77, 79 . . . 81 each have on input connected to the data output of the respective master latch stage immediately upstream thereof. Exclusive-OR gate 71 has an input connected to a feedback signal FB, and Exclusive-OR gate 73 has an input connected to the data output of the slave latch stage immediately upstream thereof, namely SLAT0. The data output of SLAT0 is also connected to the scan input (SI) of master latch stage MLAT1 of SRL1. Exclusive-OR gate 75 has an input connected to the data output of the slave stage SLAT14 of SRL14 (not shown), and the data output of SLAT14 is also connected to the scan input of MLAT15. Although SRL's 2–14 are not shown, the inputs to the master and slave latch stages thereof are preferably developed in the manner disclosed with respect to SRL0, SRL1 and SRL15.

The feedback signal FB can be developed by combining the data outputs of SRL16–SRL19 for the PSA operation desired, as is well known in the art. For example, the feedback signal FB could be obtained by Exclusive-ORing the outputs of SRL16, SRL17, SRL18 and SRL19.

Figure 1:
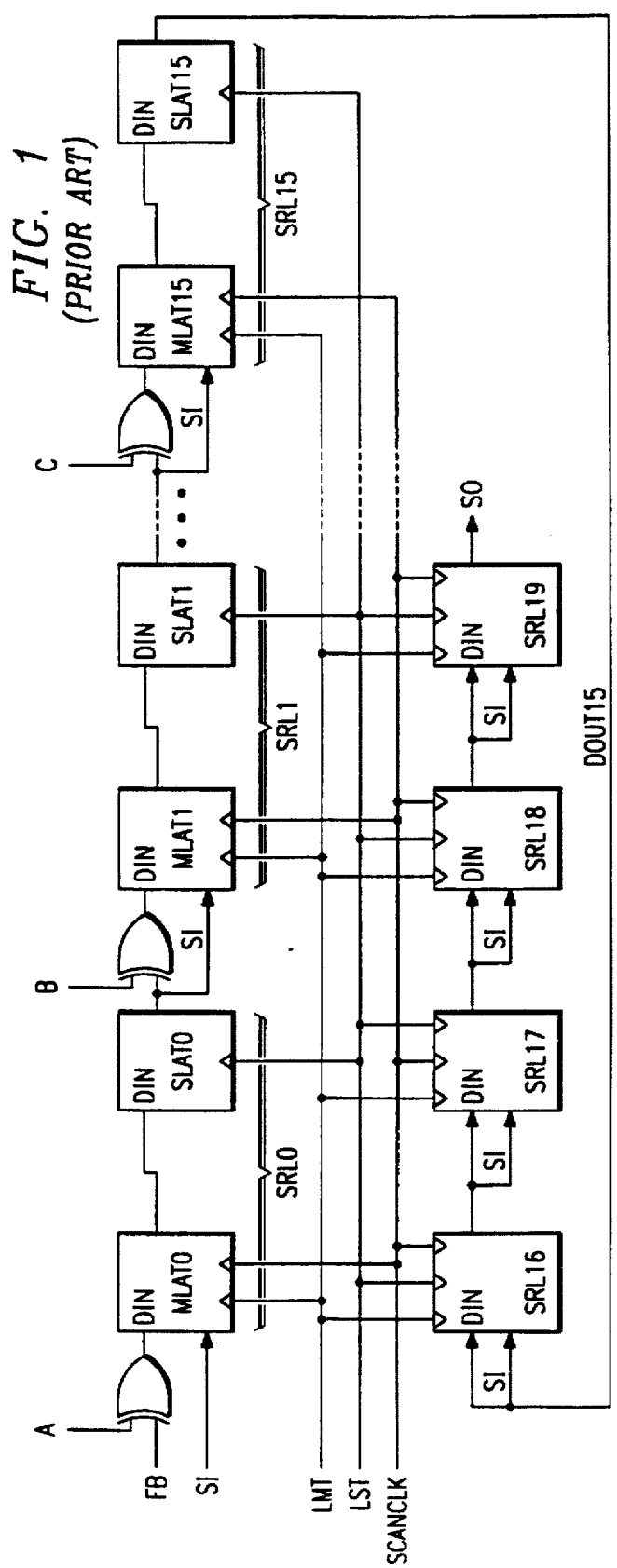
FIG. 1 illustrates prior art circuitry including a parallel signature analysis circuit.

As one example of operation of the PSA circuitry 49, the clock signals MTL, LST and the scan clock can be gated active throughout the core 13. Thereafter, the scan clock and the slave clock LST can be gated active and a predetermined seed value can then be scanned into SRL0–SRL19, as is well known in the art. After the seed value has been established in SRL0–SRL19, all clocks can again be gated off, and TM0 can be taken to a logic 0 level, thereby qualifying inputs IND0, IND1 . . . IND15 at AND gates 51, 55 . . . 59 while also driving low the outputs of AND gates 53, 57 . . . 61. Thereafter, the master clock LMT and the slave clock LST can be gated on for a desired number of master/slave clock cycles, during which Exclusive-OR gates 71, 73 . . . 75 and SRL0, SRL1 . . . SRL15 operate in the same manner as the conventional parallel signature analyzer of FIG. 1 to capture and compress the signals IND0–IND15. The low outputs of AND gates 53, 57 . . . 61 cause the respective Exclusive-OR gates 77, 79 . . . 81 to pass the respective data outputs of the master latch stages directly to the respective data inputs of the slave latch stages. Thus, in the above-described operation, each of the signals IND0–IND15 is sampled on each master clock pulse and compressed into a parallel signature, as in FIG. 1. When the desired number of master/ slave clock cycles have occurred, the master clock LMT and the slave clock LST can again be gated inactive. Thereafter, the scan clock and the slave clock LST can be gated active and the contents of SRL0–SRL19 can be scanned out to the tester for comparison to the expected signature.

Thereafter, the scan clock and the slave clock LST can be gated inactive, and the core logic can be reset to the same logic state that it was in immediately before the previous compression process was performed. Thereafter, TM0 can be taken high to qualify IND0, IND1 . . . IND15 at respective AND gates 53, 57 . . . 61, while driving low the outputs of AND gates 51, 55 . . . 59. Thereafter, the master clock LMT and the slave clock LST can be gated active for the same number of cycles as before, whereby each of the signals IND0–IND15 is sampled and compressed on the slave pulse of each master/slave clock cycle. The data sampling and data compression are accomplished in the same manner as previously done when sampling on the master clock pulses, except in this instance the slave latch stages perform the function that was performed by the master latch stages in the previous iteration and the master latch stages in this instance perform the same function performed by the slave latch stages in the previous iteration. When the master clock LMT and the slave clock LST are gated inactive at the end of the desired sampling period, the scan clock and the slave clock LST con be gated active to scan out the contents of SRL0–SRL19 for comparison to the expected signature.

Figure 2:
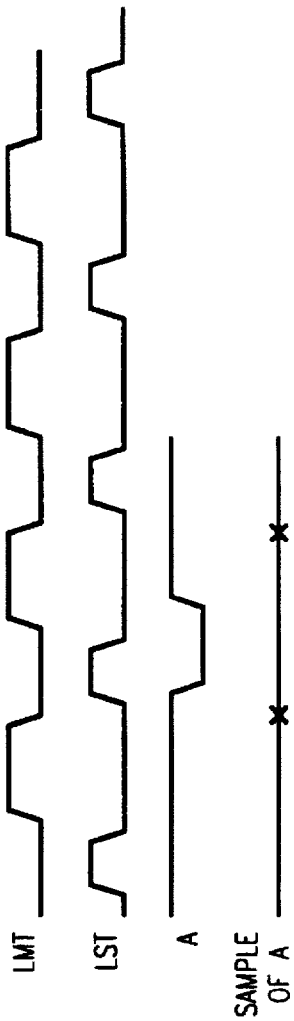
FIG. 2 is a timing diagram which illustrates the operation of the parallel signature analysis circuit of FIG. 1.
Figure 6:
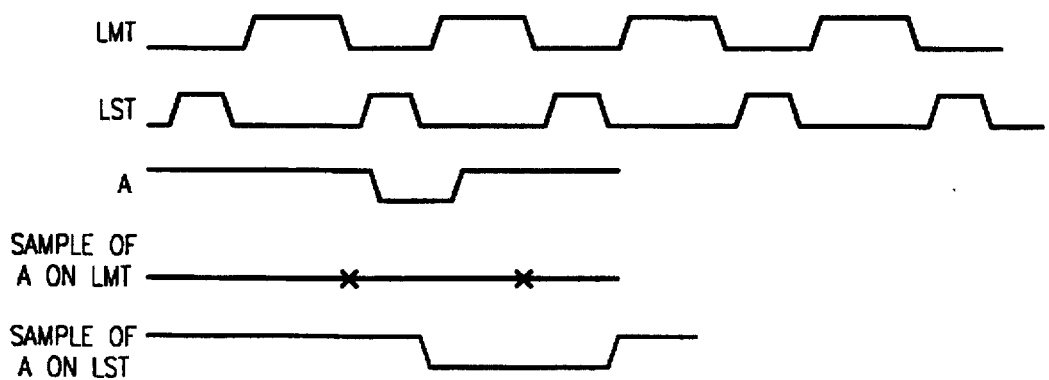
FIG. 6 is a timing diagram which illustrates one example of the operation of the present invention.

The above-described operation thus provides, in two iterations of sampling and compression, a signature of signals IND0–IND15 as sampled on the master clock LMT (first iteration), and a signature of the signals IND0–IND15 as sampled on the slave clock LST (second iteration). Because the core logic is reset before the second iteration to the same state that it was in immediately prior to the first iteration, any signals is sampled on the master clock during any desired time period under any desired operating conditions (first iteration) can also be sampled on the slave clock during the same time period and under the same operating conditions (second iteration). FIG. 6 shows how node A from FIG. 2 would be sampled (assuming falling edge clocking of all latches) on both the master clock LMT and the slave clock LST in the embodiment of FIG. 4. As shown in FIG. 6, the transitioning of node A is captured by the slave clock sampling of FIG. 4.

It should also be noted that it may not be necessary to provide every targeted signal of core 13 as a data input to PSA circuitry 49. For example, busses 23, 25, 27 and 29 of FIG. 3 may represent many more than 16 signals, yet the PSA circuitry 49 of FIG. 4 could accommodate all of them if the signals are suitably combined to produce the signals IND0–IND15. For example, if the signals are independent of one another, then they could be suitably Exclusive-Ored to produce IND0–IND15, sad if the signals are dependent upon one another, then they could be suitably multiplexed to produce IND0–IND15. In this manner, it is possible to obtain compressed data signatures of runny more than 16 signals using the 16-input PSA circuitry 49 of FIG. 4, although additional iterations would be necessary if the targeted signals were multiplexed to produce IND0-IND15.

Figure 5:
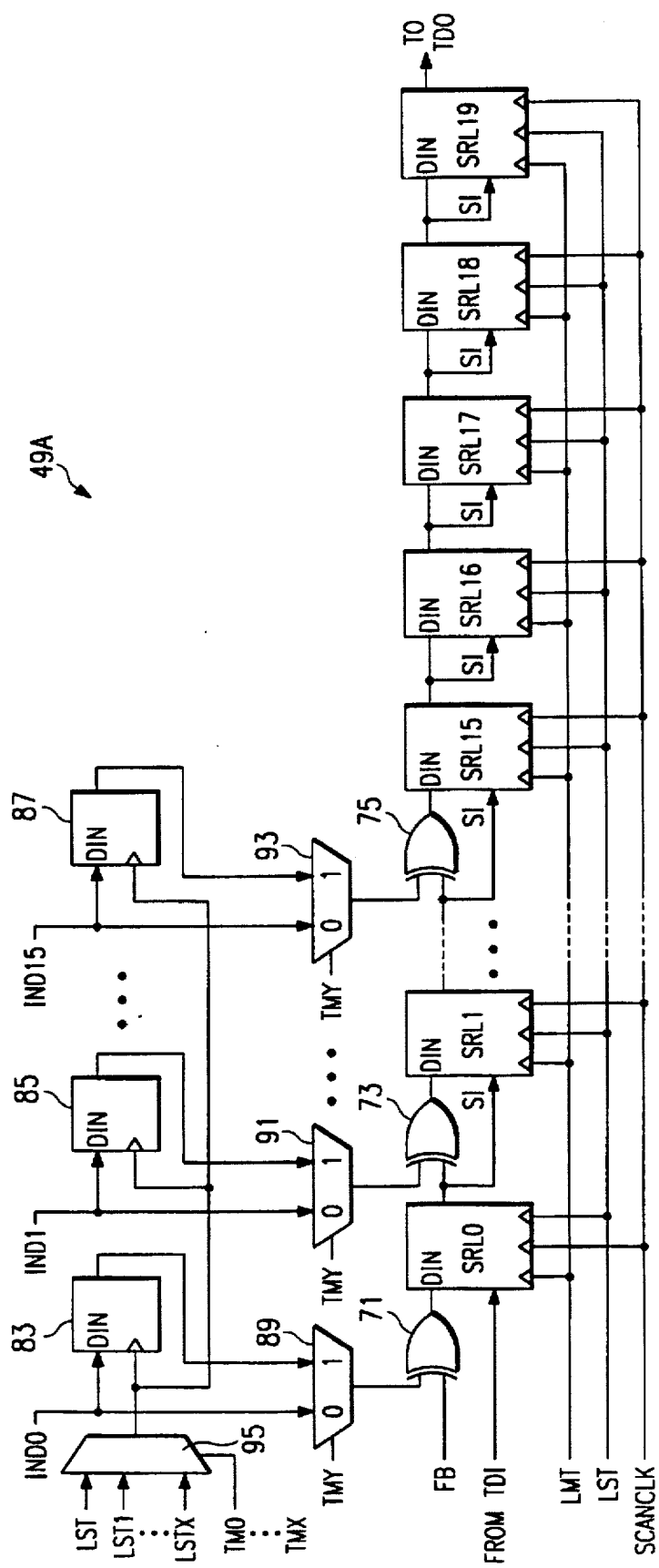
FIG. 5 illustrates another exemplary embodiment of the parallel signature analyzer of FIG. 3.

FIG. 5 illustrates another exemplary embodiment 49A of the PSA circuitry of FIG. 3. In FIG. 5, SRL0–SRL19 are not shown divided into a master latch stage and a slave latch stage because, in this embodiment, the data output of each master latch stage is directly connected to the data input of the associated slave latch stage. In the embodiment; of FIG. 5, latches 83, 85 . . . 87 are used in conjunction with multiplexers 89, 91 . . . 93 and multiplexer 95 to permit the PSA circuitry 49A to sample and compress signals IND0–IND15 on any desired clock of a multiple phase clock system. If signals IND0–IND15 are to be sampled on master clock LMT, then control signal TMY is taken low, whereby the respective signals IND0–IND15 are applied to Exclusive-OR gates 71, 73 . . . 75 and are sampled and compressed on the master clock. However, if it is desired to sample signals IND0–IND15 on slave clock LST or any one of a plurality of clocks LST1–LSTX, which may represent the slave clock delayed by respective amounts of time, then TMY is set to logic 1 whereby the data outputs of latches 83, 85 . . . 87 are connected to Exclusive-OR gates 71, 73 . . .

75. The clock selected for sampling is output from multiplexer 95 in response to multiplexer control signals TM0–TMX. The latches 83, 85 . . . 87 then sample signals IND0–IND15 on the clock selected by multiplexer 95, and the sampled signals are then available to be applied via multiplexers 89, 91 . . . 93 to Exclusive-OR gates 71, 73 . . . 75. The signals sampled by latches 83, 85 . . . 87 are then compressed into the data signature on the next pulse of master clock LMT.

As discussed above with respect to FIG. 4, the signals IND0–IND15 can be sampled and compressed for any desired re,tuber of master/slave clock cycles and with the core logic set to a known, desired state immediately before sampling and compression, and this process can be repeated for as many iterations as necessary to obtain sampling on as many clocks as desired. The combining of signals to produce IND0–IND15, as described above with respect to FIG. 4, is equally applicable to the FIG. 5 embodiment.

Referring again to FIG. 3, workers in the art will readily recognize that the PSA circuitry 49 is applicable to virtually any digital circuitry which utilizes multiple clock phases, and thus could be provided in logic modules 15, 17, 19, 21 or in peripherals circuitries 33, 35, 37 and 39. Moreover, the ASIC device 11 is merely provided as an example of digital circuitry according to the present invention. Workers in the art will readily recognize that the digital data processing circuitry 11 of FIG. 3 could take other forms, for example digital data processing circuitry 11 could be a plurality of separate integrated circuits provided on a circuit board or, as another example, digital data processing circuitry 11 could be a plurality of printed circuit boards each including a plurality of integrated circuits. The present invention provides an advancement in all digital circuitry which utilizes multiple clock phases, and is entirely independent of the manner in which such digital circuitry is physically realized.

Although, exemplary embodiments of the present; invention are described above, this description does not limit the scope of the invention, which can be practiced in a variety of embodiments.

What is claimed is:

1. A data processing system, comprising:
    a data processing device including data processing circuitry for performing data processing operations on data provided thereto, said data processing circuitry having a plurality of clock signal paths for carrying respective clock signals; and
    a peripheral device connected to said data processing device for communication with said data processing device;
    said data processing device having a parallel signature analysis circuit including a plurality of latch circuits, each said latch circuit including a data input and a data output, a first said latch circuit having said data output thereof coupled to the data input of a second said latch circuit, and said first latch circuit having said data input thereof coupled to the data output of a third said latch circuit;
    said parallel signature analysis circuit including a predetermined sample nodes associated with a circuit node driven by said data processing circuitry, sample circuitry which is coupled to said clock signal paths and which can be triggered by any of said clock signals to sample a logic state of said circuit node and to output the sampled logic state on said predetermined sample node regardless of which of said clock signals triggers said sample circuitry, and circuitry for selectively coupling said data input of said first latch circuit to said predetermined sample node.

2. The system of claim 1, including a multiplexer having a plurality of data inputs respectively connected to said clock signal paths and having an output connected to said sample circuitry.

3. The system of claim 2, wherein said sample circuitry includes a further latch circuit having a clock input connected to said multiplexer output and having a data input connected to said circuit node and having a data output connected to said sample node.

4. The system of claim 2, wherein said circuitry for selectively coupling includes a further multiplexer having a first data input connected to said circuit node and having a second data input connected to said sample node and having an output coupled to said data input of said first latch circuit.

5. The system of claim 1, wherein said parallel signature analysis circuitry includes a further predetermined sample node associated with a further circuit node driven by said data processing circuitry, said sample circuitry further operable to sample a logic state of said further circuit node and to output the sampled logic state on said further predetermined sample node regardless of which of said clock signals triggers said sample circuitry, and wherein said circuitry for selectively coupling is further operable to selectively couple said data input of said second latch circuit to said further predetermined sample node.

6. The system of claim 1, wherein said sample circuitry includes a further latch circuit having a clock input coupled to said clock signal paths and having a data input connected to said circuit node and having a data output connected to said sample node.

7. The system of claim 6, wherein said circuitry for selectively coupling includes a multiplexer having a first data input connected to said circuit node and having a second data input connected to said sample node and having an output coupled to said data input of said first latch circuit.

8. The system of claim 1, wherein said circuitry for selectively coupling includes a multiplexer having a first data input connected to said circuit node and having a second data input connected to said sample node and having an output coupled to said data input of said first latch circuit.

9. The system of claim 8, wherein said circuitry for selectively coupling further includes an exclusive-OR circuit having an input connected to said output of said multiplexer and having an output connected to said data input of said first latch circuit.

10. An electronic device, comprising:
    data processing circuitry for performing data processing operations on data provided thereto, said data processing circuitry having a plurality of clock signal paths for carrying respective clock signals; and
    a parallel signature analysis circuit including a plurality of latch circuits, each said latch circuit including a data input and a data output, a first said latch circuit having said data output thereof coupled to the data input of a second said latch circuit, and said first latch circuit having said data input thereof coupled to the data output of a third said latch circuit;
    said parallel signature analysis circuit including a predetermined sample node associated with a circuit node driven by said data processing circuitry, sample circuitry which is coupled to said clock signal paths and which can be triggered by any of said clock signals to sample a logic state of said circuit node and to output the sampled logic state on said predetermined sample node regardless of which of said clock signals triggers said sample circuitry, and circuitry for selectively coupling said data input of said first latch circuit to said predetermined sample node.

11. The device of claim 10, including a multiplexer having a plurality of data inputs respectively connected to said clock signal paths and having an output connected to said sample circuitry.

12. The device of claim 11, wherein said sample circuitry includes a further latch circuit having a clock input connected to said multiplexer output and having a data input connected to said circuit node and having a data output connected to said sample node.

13. The device of claim 11, wherein said circuitry for selectively coupling includes a further multiplexer having a first data input connected to said circuit node and having a second data input connected to said sample node and having an output coupled to said data input of said first latch circuit.

14. The device of claim 10, wherein said parallel signature analysis circuitry includes a further predetermined sample node associated with a further circuit node driven by said data processing circuitry, said sample circuitry further operable to sample a logic state of said further circuit node and to output the sampled logic state on said further predetermined sample node regardless of which of said clock signals triggers said sample circuitry, and wherein said circuitry for selectively coupling is further operable to selectively couple said data input of said second latch circuit to said further predetermined sample node.

15. The device of claim 10, wherein said sample circuitry includes a further latch circuit having a clock input coupled to said clock signal paths and having a data input connected to said circuit node and having a data output connected to said sample node.

16. The device of claim 15, wherein said circuitry for selectively coupling includes a multiplexer having a first data input connected to said circuit node and having a second data input connected to said sample node and having an output coupled to said data input of said first latch circuit.

17. The device of claim 10, wherein said circuitry for selectively coupling includes a multiplexer having a first data input connected to said circuit node and having a second data input connected to said sample node and having an output coupled to said data input of said first latch circuit.

18. The device of claim 17, wherein said circuitry for selectively coupling further includes an exclusive-OR circuit having an input connected to said output of said multiplexer and having an output connected to said data input of said first latch circuit.

19. A circuit for producing a parallel test signature from data obtained from a target circuit, comprising:

a plurality of latch circuits, each said latch circuit including a data input and a data output, a first said latch circuit having said data output thereof coupled to the data input of a second said latch circuit, and said first latch circuit having said data input thereof coupled to the data output of a third said latch circuit;

a predetermined sample circuitry with a node of the target circuit;

sample circuitry which includes a plurality of inputs for receiving respective clock signals from the target circuit and which can be triggered by any of said clock signals to sample a logic state of said node of the target circuit and to output the sampled logic state on said predetermined sample node regardless of which of said clock signals triggers said sample circuitry; and circuitry for selectively coupling said data input of said first latch circuit to said predetermined sample node.

* * * * *